(12) United States Patent
Bendel et al.

(10) Patent No.: US 8,678,765 B2
(45) Date of Patent: Mar. 25, 2014

(54) ROTOR BLADE WITH DRAINAGE BORE HOLE

(75) Inventors: Urs Bendel, Fockbek (DE); Lenz Simon Zeller, Kiel (DE)

(73) Assignee: Repower Systems SE, Hamburg (DE)

( * ) Notice: Subject to any disclaimer, the term of this patent is extended or adjusted under 35 U.S.C. 154(b) by 714 days.

(21) Appl. No.: 12/915,239

(22) Filed: Oct. 29, 2010

(65) Prior Publication Data

US 2011/0103963 A1     May 5, 2011

(30) Foreign Application Priority Data

Nov. 2, 2009  (DE) .......................... 10 2009 046 293

(51) Int. Cl.
    *F03D 1/00*   (2006.01)

(52) U.S. Cl.
    USPC ........ 416/90 A; 29/463; 29/889.7; 416/231 R

(58) Field of Classification Search
    USPC .................. 415/169.1, 169.2; 29/463, 889.7; 416/90 A, 90 R, 91, 231 R, 232
    See application file for complete search history.

(56) References Cited

U.S. PATENT DOCUMENTS

| | | | | |
|---|---|---|---|---|
| 6,124,835 | A * | 9/2000 | Nguyen et al. ................. | 343/881 |
| 6,979,179 | B2 * | 12/2005 | Møller Larsen .......... | 416/223 R |
| 7,179,059 | B2 * | 2/2007 | Sorensen et al. ............. | 416/226 |
| 7,473,385 | B2 * | 1/2009 | Stiesdal et al. ................ | 264/314 |
| 7,607,894 | B2 * | 10/2009 | Mustaros et al. ......... | 416/231 R |
| 8,177,509 | B2 * | 5/2012 | Hansen ..................... | 416/146 R |
| 8,342,805 | B2 * | 1/2013 | Mendez Hernandez et al. .......................... | 416/146 R |
| 8,562,302 | B2 * | 10/2013 | Bakhuis et al. ............... | 416/226 |
| 2005/0214122 | A1 * | 9/2005 | Sorensen et al. .............. | 416/233 |
| 2007/0036659 | A1 * | 2/2007 | Hibbard ........................ | 416/233 |
| 2007/0081900 | A1 * | 4/2007 | Nies .............................. | 416/224 |
| 2009/0035148 | A1 * | 2/2009 | Livingston et al. ........... | 416/232 |
| 2009/0146433 | A1 * | 6/2009 | Althoff et al. ................... | 290/55 |
| 2009/0226702 | A1 | 9/2009 | Madsen et al. | |
| 2010/0062238 | A1 * | 3/2010 | Doyle et al. ............... | 428/295.1 |
| 2011/0103963 | A1 * | 5/2011 | Bendel et al. ............. | 416/229 R |

(Continued)

FOREIGN PATENT DOCUMENTS

| CN | 1479838 | 3/2004 |
|---|---|---|
| CN | 101358576 | 2/2009 |

(Continued)

*Primary Examiner* — Edward Look
*Assistant Examiner* — Christopher R Legendre
(74) *Attorney, Agent, or Firm* — Rankin, Hill & Clark LLP

(57) ABSTRACT

A method for the production of a rotor blade (1) for a wind power plant, wherein the produced rotor blade (1) in its longitudinal extension, which extends from a rotor blade root (2) essentially to a rotor blade tip (3), has at least one area, in which the rotor blade has an aerodynamic blade section (4, 4', 4"), which has a leading edge (5) and a trailing edge (6), which are connected via a suction side (7) and a pressure side (8) of the blade section (4, 4', 4"), wherein at least a first and at least a second molded part (11, 12) manufactured in the longitudinal direction of the rotor blade (1) are provided for a suction side (7) and a pressure side (8) of the rotor blade (1), which are to be connected with each other in the areas of the leading edge (5) and the trailing edge (6). A corresponding rotor blade (1) for a wind power plant and a wind power plant with a corresponding rotor blade (1).

14 Claims, 2 Drawing Sheets

(56) References Cited

U.S. PATENT DOCUMENTS

| | | | | |
|---|---|---|---|---|
| 2012/0003094 | A1* | 1/2012 | Hansen | 416/146 R |
| 2012/0067515 | A1* | 3/2012 | Dahl et al. | 156/245 |
| 2013/0126089 | A1* | 5/2013 | Fredskild et al. | 156/305 |

FOREIGN PATENT DOCUMENTS

| | | | |
|---|---|---|---|
| DE | 19528862 | | 2/1997 |
| DE | 10 2004 028 917 | | 1/2006 |
| DE | 102004028917 | A1 | 1/2006 |
| DE | 102005047959 | B4 | 1/2008 |
| DE | 102008002983 | | 2/2009 |
| DE | 102008055479 | | 6/2009 |
| DE | 102008048617 | A1 * | 4/2010 |
| EP | 1607623 | | 12/2005 |
| EP | 1607624 | | 12/2005 |
| EP | 1 342 009 | | 4/2009 |
| EP | 1342009 | B1 | 4/2009 |
| JP | 2005105916 | | 4/2005 |

* cited by examiner

ROTOR BLADE WITH DRAINAGE BORE HOLE

BACKGROUND OF THE INVENTION

1. Field of the Invention

The invention relates to a method for producing a rotor blade for a wind power plant, which has a drainage bore hole in the area of the rotor blade tip, a rotor blade for a wind power plant with a drainage bore hole in the area of the rotor blade tip, a wind power plant with a corresponding rotor blade and the use of a surface element in a rotor blade for a wind power plant, which has a drainage bore hole in the area of the rotor blade tip.

2. Description of Related Art

Water collects inside rotor blades of wind power plants as a result of condensation or direct penetration and must be drained. If the water cannot escape, there is a risk in the winter that the water freezes and the rotor blade can be damaged or destroyed through expansion during freezing. Another potential risk is that the accumulated water in the rotor blade tip vaporizes abruptly as a result of a lightning strike into the rotor blade tip, whereby the rotor blade can also be damaged or destroyed. Thus, rotor blades for wind power plants are provided with a drainage bore hole in the area of the rotor blade tip that connects the inner side of the rotor blade with its outside and makes it possible for the water to escape.

EP 1 342 009 B1 discloses a rotor blade for wind power plants, which has a lightning rod in the area of the rotor blade tip, which is arranged in a bore hole in the blade tip. Lightning rod and bore hole together form a drainage system for the rotor blade.

DE 10 2004 028 917 A1 discloses a rotor blade for a wind power plant, which has at least one hollow space, which is adjacent to an outside of the rotor blade and is connected with the outside via at least one drainage bore hole. A water-permeable collection element, such as a sieve, is arranged in the hollow area such that water gets to the drainage bore hole from the hollow space through the collection element. It is, thus, prevented that the drainage bore hole gets clogged with dirt and small particles after some time, which are also present inside the rotor blade and can be rinsed with water through the drainage bore hole.

The rotor blade tips described in these documents are very complicated to manufacture since they have the drainage bore holes on the outermost blade tip so that a very exact form fit and manufacture is necessary at this location. In the case of a construction method of a rotor blade with half shells or with corresponding molded parts, a corresponding drainage bore hole, which is arranged in a joint to be glued between the half shells, also forms a structural weak point in the joint such that the rotor blade is structurally weakened on the rotor blade tip.

Alternatively, a drainage bore hole can also be provided in the area of the rotor blade tip on the suction side or the pressure side of the rotor blade. The leading edge of a rotor blade is connected with the trailing edge of the rotor blade via the suction side and the pressure side. The suction side of the rotor blade is the side with the longer flow surface with respect to the pressure side.

Even when a drainage bore hole is arranged in the area of the rotor blade tip on the suction or pressure side of a rotor blade, the water is pushed out of the inside of the rotor blade through the drainage opening through the effects of centrifugal force when the rotor is rotating.

Another effect, which supports drainage, is that water is suctioned out of the inside of the rotor blade through the drainage bore hole due to the low air pressure of the air flowing past the suction side at a high speed according to Bernoulli's principle. The rotor blade is not normally hermetically sealed on its blade root so that an air flow can be created due to this effect. This effect also occurs to a somewhat lesser degree on the pressure side of the rotor blade so that a suction bore hole can also be arranged on the pressure side of a rotor blade.

One difficulty with the production of a drainage bore hole on the suction or pressure side of the rotor blade in the area of the rotor blade tip is that rotor blades are generally made of half shells, i.e. molded parts, which represent the suction side or respectively the pressure side, that are glued together.

In larger wind power plants, corresponding molded parts are generally made of fiber glass and/or carbon fibers in fiber-composite technology and are connected with synthetic resins such as polyester resins or epoxy resins. The half shells can also be made of several molded parts respectively for the pressure side and for the suction side, which also must be connected with each other.

In order to establish a secure connection, the molded parts of the pressure side are generally glued to the molded parts of the suction side. Suitable connection means are in particular adhesives or adhesive mixtures, for example made of polyester resins and/or epoxy resins. In particular, in the area of the rotor blade tip, a large amount of adhesive is needed for this.

Since the connection means when gluing the molded parts together is liquid and an adhesive excess is unavoidable in order to guarantee a secure adhesion, the connection means can run uncontrolled into the inside of the rotor blade. However, since the adhesive expansion inside the blade occurs uncontrolled, it is not possible to always place a drainage bore hole at the same location since this location can be covered by connection means. However, if the drainage bore hole is always bored at a sufficient distance from the blade tip, then a considerable amount of water can collect inside the blade under certain circumstances.

BRIEF SUMMARY OF THE INVENTION

Based on this state of the art, the object of the present invention is to specify a method for the production of a rotor blade for a wind power plant as well as a corresponding rotor blade, with which it is possible to manufacture a rotor blade in an efficient and simple manner, in which a drainage bore hole can be established at a previously defined location in the area of the rotor blade tip, independently of the degree of adhesive excess.

This object is solved through a method for the production of a rotor blade for a wind power plant, wherein the produced rotor blade in its longitudinal extension, which extends from a rotor blade root essentially to a rotor blade tip, has at least one area, in which the rotor blade has an aerodynamic blade section, which has a leading edge and a trailing edge, which are connected via a suction side and a pressure side of the blade section, wherein at least a first and at least a second molded part manufactured in the longitudinal direction of the rotor blade are provided for a suction side and a pressure side of the rotor blade, which are to be connected with each other in the areas of the leading edge and the trailing edge, with the following process steps:

a connection element will be or is connected with an inner side of the at least one first molded part at least in the area of the rotor blade tip on the leading edge by means of a connection means, wherein the connection element protrudes beyond the first molded part at the leading edge,
   a surface element will be or is connected with the connection element on the leading edge in the area of the rotor blade tip or is designed as one piece with the connection element, wherein the surface element in the area of the trailing edge is essentially flush with the first molded part, the at least one second molded part is joined together with the first molded part, wherein on the leading edge an inner side of the second molded part is connected with the part of the connection element protruding beyond the first molded part and on the trailing edge, a connection means is inserted between the first and second molded parts, a drainage bore hole is or will be bored or arranged in the area of the first molded part closed by the surface element of the trailing edge.

The invention is based on the fundamental idea that an excess or a large amount of connection means is prevented from running into the inside of the rotor blade and covering the location where the drainage opening should be installed by means of the surface element both on the leading edge as well as on the trailing edge. Due to the fact that the inside or respectively the inner surface of the rotor blade is smooth and free of connection means at the location of the drainage bore hole, a controlled and speedy drainage of water to the outside is ensured by the drainage bore hole. According to the invention, connection means are in particular adhesives, such as synthetic resin, in particular polyester resin or epoxy resin.

According to the invention, on the leading edge, a connection element is first connected with the front edge of the first molded part, which in the framework of the present invention has that molded part for which a drainage bore hole is provided. This connection element, which can be in particular a glue flap, has the surface element according to the invention or will subsequently be connected with the surface element. The surface element according to the invention must effectively hold back the connection means, that is an adhesive such as a synthetic resin, also in the liquid state, but can be water-permeable or waterproof. The mainly flush closure of the surface element with the first molded part in the area of the trailing edge results in a prevention of a penetration of connection means also from this side or its restricted such that the drainage bore hole or respectively the location provided for it is not covered with connection means.

Depending on whether a drainage bore hole should be arranged on the suction side or the pressure side, the at least one first molded part is the molded part of the suction side and the at least one second molded part is the molded part of the pressure side or vice versa.

In an advantageous improved embodiment, the surface element is connected with the second molded part on its edge facing away from the rotor blade tip in the area between the connection means. The surface element is, thus, completely flush with the inner side of the second molded part on its end facing the rotor blade root so that water cannot collect in the intermediate space between the surface element and the second molded part. This is of particular advantage when the surface element itself is waterproof.

The surface element with its edge arranged toward the rotor blade tip is preferably applied to a lightning arrester adapter fin or fitted on a lightning arrester adapter fin. This prevents a hollow space from forming between the surface element and the lightning arrester adapter fin, in which water can collect.

The connection of the first and second molded parts of the connection element and/or the surface element preferably occurs through adhesion and/or through lamination. In particular, synthetic resins such as epoxy resin or polyester resins are provided as the adhesive.

The connection means preferably hardens or is already hardened before the joining of the first and second molded parts between the first molded part and the connection element on the leading edge. Since the connection element, e.g. a glue flap, can be glued fitting accurately with the first molded part on the leading edge, a relatively small amount of connection means is needed at this location so that the risk of connection means running inside, i.e. to the inner side of the first molded part, is relatively low.

The measure of first letting the connection between the connection element and the first molded part harden or using an already hardened connection before joining the first and second molded parts has the advantage that the larger amount of connection means, which is necessary on the leading edge between the connection element and the second molded part, cannot run through a gap between the connection element and the first molded part since this connection has already hardened.

The object of the invention is also solved through a rotor blade for a wind power plant, wherein the rotor blade has a longitudinal extension, which extends from a rotor blade root essentially to a rotor blade tip, wherein an aerodynamic blade section is provided in at least one area of the rotor blade, which has a leading edge and a trailing edge, which are connected via a suction side and a pressure side of the blade section, wherein at least one first molded part and at least one second molded part are provided for each suction side and for the pressure side of the rotor blade, which are connected with each other at least in the area of the rotor blade tip on the leading edge and on the trailing edge by means of at least one connection means and/or connection element, respectively, wherein a drainage bore hole is provided on the suction side or the pressure side in the area of the rotor blade tip, which is further characterized in that a surface element is provided in the area of the rotor blade tip, which reaches in the direction of the rotor blade root at least up to the drainage bore hole, wherein the surface element contacts the connection means and/or connection elements on the leading edge and the trailing edge or is connected with it and is essentially impermeably flush for the connections means with the first molded part in the area of the trailing edge.

The rotor blade according to the invention with the surface element according to the invention also has the advantage that a drainage bore hole could be created on the suction side in the area of the rotor blade tip defined at a position very close to the rotor blade tip without the risk that the inner side of the first molded part is moistened and contaminated with excess adhesive. This leads to a secure drainage and, thus, to a rotor blade that can also be operated securely in the long run.

This rotor blade according to the invention is preferably produced according to the method according to the invention described above.

The surface element preferably comprises a one-layer or multi-layer fiber glass mat or an aluminum sheet. Both alternatives are light-weight embodiments, which meet the purpose of holding back excess adhesive without significantly increasing the weight of the rotor blade in the area of the rotor blade tip. Since the surface element also provides the connection means with a defined space, in which the connection means can expand, which is considerably smaller than the previously open inside of the rotor blade at the rotor blade tip, it is also possible to use considerably less adhesive than before so that the measure according to the invention can lead to a weight reduction or the weight increase is at least partially counterbalanced by the economization of connection means.

The rotor blade experiences an advantageous further embodiment when the surface element is applied toward the rotor blade tip on an adapter fin of a lightning arrester or is fitted on an adapter fin of a lightning arrester.

The surface element is preferably connected with the second molded part on its end facing away from the rotor blade tip between the connection means or has a distance of less than 10 mm, in particular less than 3 mm, from the second molded part.

A particularly simple preferred embodiment is characterized in that the connection element and the surface element are designed as one piece. This saves a process step, in which the surface element is connected with the connection element.

When the at least one connection element on the leading edge comprises a, in particular knitted or woven, glue flap, which overlaps the suction side and the pressure side and is glued to and/or laminated with the first and second molded parts, a particularly efficient and secure connection of the molded parts on the profile leading edge is ensured.

The object of the invention is also solved through a wind power plant with a rotor blade according to the invention.

The object of the invention is also finally solved through the use of a surface element in a rotor blade for a wind power plant, which has a drainage bore hole in the area of the rotor blade tip, in particular as described above, for keeping the drainage bore hole free of a connection means.

BRIEF DESCRIPTION OF THE DRAWINGS

The invention is described below, without restricting the general intent of the invention, based on exemplary embodiments in reference to the drawings, whereby we expressly refer to the drawings with regard to the disclosure of all details according to the invention that are not explained in greater detail in the text. The drawings show in.

DETAILED DESCRIPTION OF THE INVENTION

In the following figures, the same or similar types of elements or respectively corresponding parts are provided with the same reference numbers in order to prevent the item from needing to be reintroduced.

Figure 1:
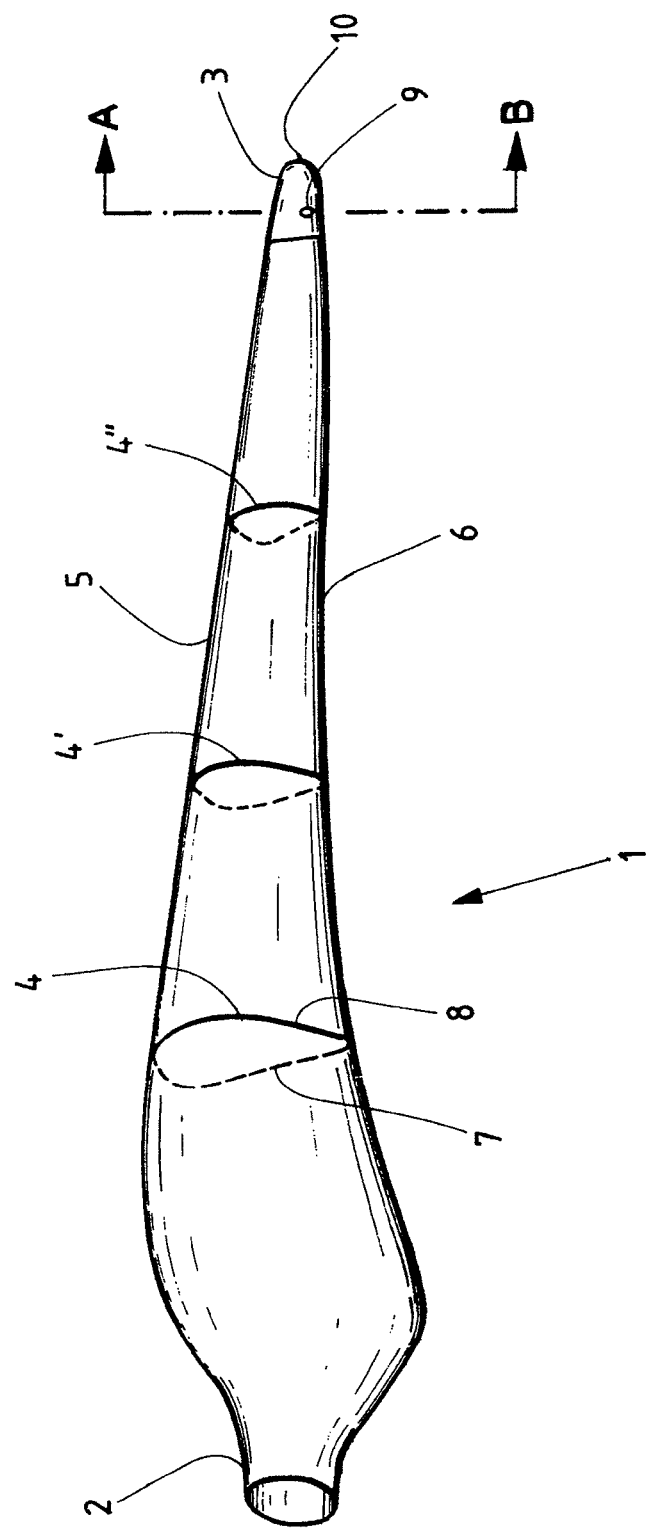
FIG. 1 a schematic representation of a rotor blade.

FIG. 1 shows schematically a rotor blade 1, which extends essentially longitudinally from a rotor blade root 2 to a rotor blade tip 3. Over the largest part of the longitudinal extension, the rotor blade 1 has a cross-sectional profile or blade section, which is represented using lines at three locations, namely at the blade section 4 near the rotor blade root 2, at the blade section 4' in the middle and at a blade section 4" toward the rotor blade tip 3.

Each of the cross-sectional profiles 4, 4', 4" extends from a leading edge 5 to a trailing edge 6 and has a suction side 7 and a pressure side 8. The profile on the suction side 7 is generally longer than that on the pressure side 8 so that air must flow faster on the suction side 7 and has a lower air pressure than on the pressure side 8.

In the area of rotor blade tip 3, it is shown that a drainage bore hole 9 is provided as well as a lightning receptor 10 directly on the rotor blade tip 3. The lightning receptor 10 can comprise a metal pin or a metal surface, for example an aluminum surface, which is connected with a lightning arrester in the form of a lightning cable inside the rotor blade 1, for example via a lighting arrester adapter. Such a lightning arrester adapter can be designed as a lightning arrester adapter fin. The drainage bore hole generally has a diameter of 6 mm to 10 mm and can be arranged in aluminum parts of the lightning arrester, directly on the rotor blade tip 3 or outside of the aluminum part of the lightning arrester but still near the rotor blade tip 3.

Figure 2:
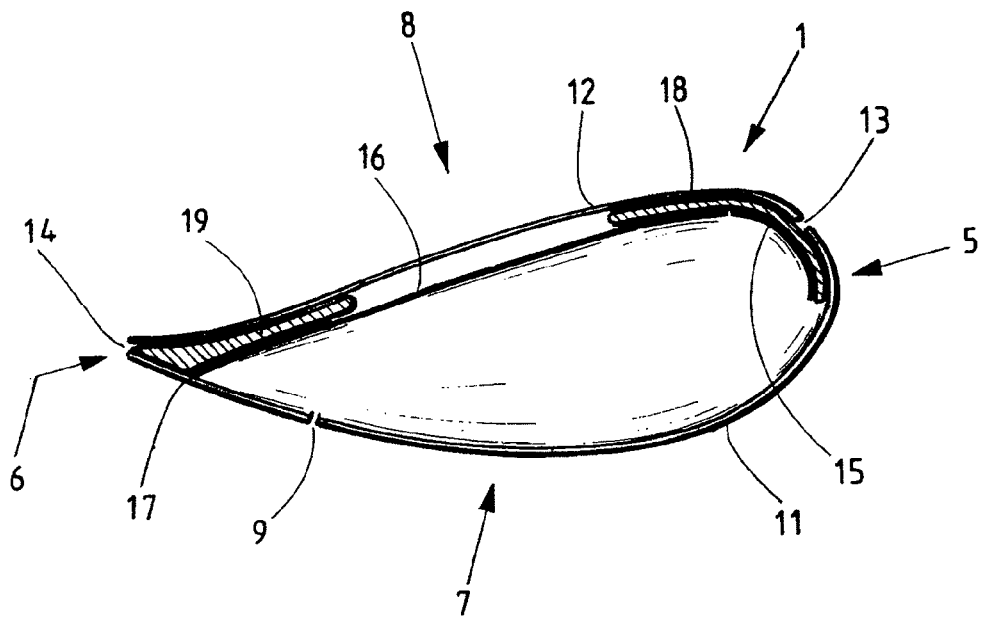
FIG. 2 a cross-section through a rotor blade according to the invention in a schematic representation and FIG. 3 a diagonal top view of a part of a rotor blade according to the invention in a schematic representation.

FIG. 2 shows a cross-section through a rotor blade 1 according to the invention in the area of the rotor blade tip, wherein this cross-section comprises the drainage bore hole 9. The cross-section corresponds with a cut along the line A-A from FIG. 1.

The rotor blade 1 consists, in FIG. 2, at this position of two half shells, namely a half shell or respectively a molded part 11 of the suction side 7 and a half shell or respectively a molded part 12 of the pressure side 8. The route the air travels when flowing around the rotor blade is greater on the suction side 7 than on the pressure side 8. The drainage bore hole 9 is arranged in the molded part 11 of the suction side 7. Thus, the molded part 11 of the suction side 7 according to the invention is the first molded part 11 and the molded part 12 of the pressure side 8 is the second molded part 12. This designation can be reverse if a drainage bore hole is provided on the pressure side rather than on the suction side.

In the area of the leading edge 5, a glue flap 15 is provided inside the rotor blade 1, which bridges a leading abutting edge 13 between the half shells or, respectively, molded parts 11 and 12. This means that the connection element 15, in this case a glue flap, partially overlaps both the molded part 11 as well as the molded part 12 and can be permanently connected with it. In this manner, a secure connection is established on the leading edge 5, although the molded parts 11 and 12 do not overlap each other at this position but rather just abut each other.

For this, the front end of the connection element or respectively the glue flap 15 is first connected with the front area of the molded part 11 of the suction side 7 by means of a connection means 18 and the connection is hardened, if appropriate, or one lets it harden. The surface element 16 is then connected, for example glued, with the trailing edge of the connection element 15. The surface element 16 can also be designed as one piece with the connection element or respectively the glue flap 15. There is no connection in this case since the surface element 16 already exists.

The surface element 16 rests in the area of the profile trailing edge 6 in a contact point 17 or respectively a contact line on the inner side of the molded part 11 of the suction side 7 so that the connection means 19, which is inserted between the molded parts 11 and 12 on the trailing edge 6, does not penetrate further into the inside of the rotor blade 1. The inside, i.e. the inner surface of the first molded part 11 on the other side of the contact point 17 of the surface element 16 with the first molded part 11, is thereby kept free of connection means.

On the other hand, a secure adhesion of the two molded parts 11 and 12 is also ensured in the area of the trailing edge 6 on a rear abutting edge 14. Excess connection means 19 do not thereby run down the inner side of the molded part 11 of the suction side 7, but rather fill the intermediate space between the surface element 16 and the inner side of the molded part 12 of the pressure side 8.

On the leading edge, further connection means 18 are inserted into the intermediate space between the glue flap 15 and surface elements 16 on one side and the inner side of the molded part 12 of the pressure side 8 on the other side during the joining of the molded parts 11 and 12 so that a secure connection is also established here without the connection means 18 getting inside on the other side of the surface element 16.

It is ensured in this manner that no connection means and no adhesive obstruct the drainage bore hole at the designated location where a drainage bore hole 9 is provided. A controlled drainage is also ensured on the smooth inner side of the molded part 11 of the suction side 7.

Figure 3:
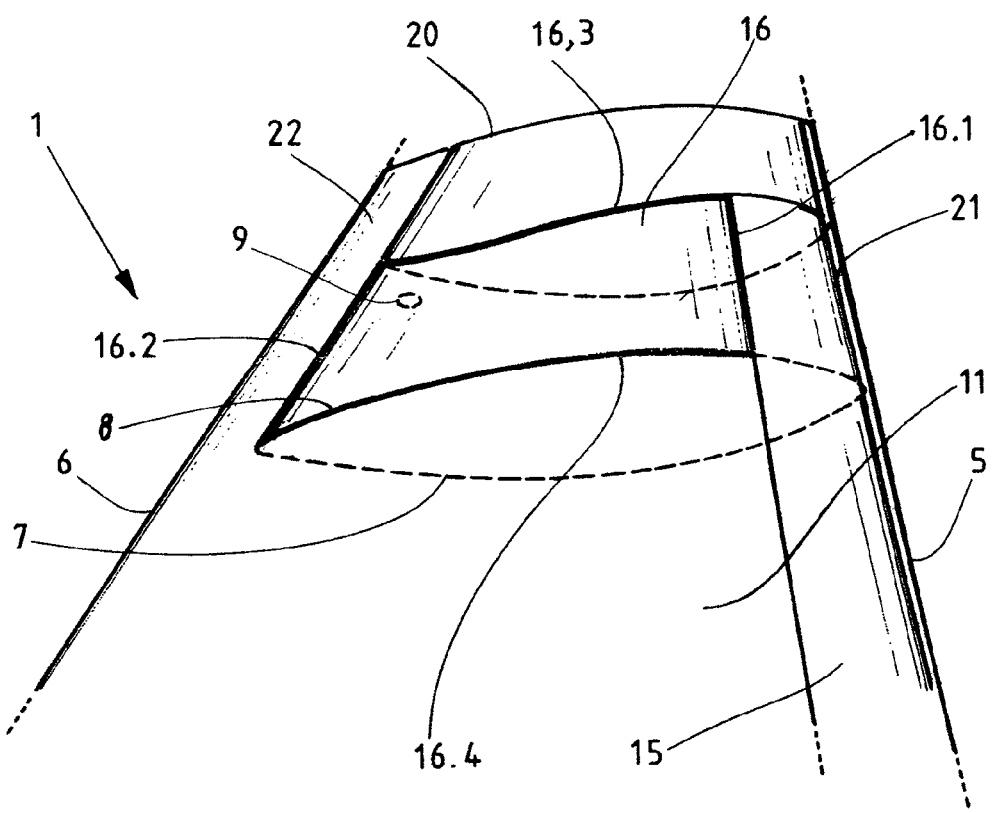

FIG. 3 shows the situation of FIG. 2 perspectively while leaving out the molded part 12 of the pressure side 8. The perspective, schematic view goes diagonally from the pressure side in the direction of the rotor blade tip 3 (not shown).

The right side shows the leading edge 5, the left side the trailing edge 6. A lightning arrester adapter fin 20, to which the surface element 16 connects, which is indicated by the bold lines, is shown in the direction of the rotor blade tip 3. The molded part 11 of the suction side 7 is shown on the bottom side. This has an edge on the leading edge 5, which corresponds with the edge that abuts against the abutting edge 13 in FIG. 2.

The molded part 11 runs relatively flat towards the rear on the trailing edge 6, as is also apparent from FIG. 2. The surface element 16 follows from the lightning arrester adapter fin 20 in the direction of the rotor blade root 2. The blade-tip-side edge 16.3 of the surface element 16 connects directly to the lightning arrester adapter fin 20 or lies on it. The blade-root-side edge 16.4 of the surface element is located at a short distance from the molded part 12 of the pressure side 7 or is connected with the molded part 12, which is however not shown in FIG. 3.

The leading edge 16.4 of the surface element is connected with the glue flap 15, which extends in FIG. 3 not only at the position of the surface element 16, but continues along the front side of the molded part 11 of the suction side in the direction of the rotor blade root 2. A secure connection of the molded parts 11 and 12 of the suction side 7 and the pressure side 8 along the entire leading edge 5 is, thus, ensured.

The trailing edge 16.2 of the surface element 16 lies on the inside of the molded part 11 of the suction side 7. The surface 22 behind the trailing edge 16.2 of the surface element 16 is an adhesive surface, which is completely provided with connection means 19, in order to ensure a secure adhesion or respectively connection of the molded parts 11 and 12 of the suction side 7 and of the pressure side 8.

The contours of the suction side 7 at the position of the blade-tip-side edge 16.3 and the blade-root-side edge 16.4 of the surface element 16 are also indicated by dashed lines so that together they represent the blade sections at these positions along the longitudinal extension of the rotor blade 1.

A drainage bore hole 9 is also shown in the molded part 11 of the suction side 7, which is arranged very far in the direction of the rotor blade tip 3 and in the direction of the trailing edge 6. Without a surface element 16 according to the invention, this point would likely be covered with a film of excess connection means 19, which would hinder the installation of a drainage bore hole 9 and would make controlled drainage difficult.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCES

| | |
|---|---|
| 1 | Rotor blade |
| 2 | Rotor blade root |
| 3 | Rotor blade tip |
| 4, 4', 4" | Blade section |
| 5 | Leading edge |
| 6 | Trailing edge |
| 7 | Suction side |
| 8 | Pressure side |
| 9 | Drainage bore hole |
| 10 | Lightning receptor |
| 11 | First molded part |
| 12 | Second molded part |
| 13 | Leading abutting edge |
| 14 | Trailing abutting edge |
| 15 | Glue flap |
| 16 | Surface element |
| 16.1 | Leading edge of the surface element |
| 16.2 | Trailing edge of the surface element |
| 16.3 | Blade-tip-side edge of the surface element |
| 16.4 | Blade-root-side edge of the surface element |
| 17 | Contact point |
| 18, 19 | Connection means |
| 20 | Lightning arrester adapter fin |
| 21 | Leading edge of the molded part |
| 22 | Adhesive surface |

The invention claimed is:

1. Method for the production of a rotor blade (1) for a wind power plant, wherein the produced rotor blade (1) in its longitudinal extension, which extends from a rotor blade root (2) essentially to a rotor blade tip (3), has at least one area, in which the rotor blade has an aerodynamic blade section (4, 4', 4"), which has a leading edge (5) and a trailing edge (6), which are connected via a suction side (7) and a pressure side (8) of the blade section (4, 4', 4"), wherein at least a first and at least a second molded part (11, 12) manufactured in the longitudinal direction of the rotor blade (1) are provided for a suction side (7) and a pressure side (8) of the rotor blade (1), which are connected with each other in the areas of the leading edge (5) and the trailing edge (6), with the following process steps:

a connection element is connected with an inner side of the at least one first molded part (11) at least in the area of the rotor blade tip (3) on the leading edge (5) by means of a connection means (18), wherein the connection element (15) protrudes beyond the first molded part (11) at the profile leading edge (5), a surface element (16) is connected with the connection element (15) on the leading edge (5) in the area of the rotor blade tip (3) or is designed as one piece with the connection element (15), wherein the surface element (16) in the area of the trailing edge (6) is essentially flush with the first molded part (11), the at least one second molded part (12) is joined together with the first molded part (11), wherein on the leading edge (5) an inner side of the second molded part (12) is connected with the part of the connection element (15) protruding beyond the first molded part (11) and on the trailing edge (6) a connection means (19) is inserted between the first and second molded parts (11, 12), a drainage bore hole (9) is bored or arranged in the area of the first molded part (11) closed by the surface element (16) of the trailing edge (6).

2. The method according to claim 1, wherein the surface element (16) is connected and closes flush with the second molded part (12) on its edge (16.4) facing away from rotor blade tip (3) in the area between the connection means (18, 19).

3. The method according to claim 1, wherein the surface element (16), with its edge (16.3) arranged toward the rotor blade tip, is applied to a lightning arrester adapter fin (20) or fitted on a lightning arrester adapter fin (20).

4. The method according to claim 1, wherein the connection of the first and second molded parts (11, 12), of the connection element (15) and/or of the surface element (16), occurs through adhesion and/or through lamination.

5. The method according to claim 1, wherein the connection means (18) between the first molded part (11) and the connection element (15) on the leading edge (5) hardens or is hardened before the joining of the first and second molded parts (11, 12).

6. Rotor blade (1) for a wind power plant, wherein the rotor blade (1) comprises:
- a longitudinal extension, which extends from a rotor blade root (2) essentially to a rotor blade tip (3),
- wherein an aerodynamic blade section (4, 4', 4") is provided at least in one area of the rotor blade (1), which has a leading edge (5) and a trailing edge (6), which are connected via a suction side (7) and a pressure side (8) of the blade section (4, 4', 4"),
- wherein at least one first molded part (11) and at least one second molded part (12) are provided for each of the suction side (7) and for the pressure side (8) of the rotor blade (1), which are connected with each other at least in the area of the rotor blade tip (3) on the leading edge (5) and on the trailing edge (6) by means of at least one connection means (18, 19) and/or connection element (15) respectively,
- wherein a drainage bore hole (9) is provided on the suction side (7) or the pressure side (8) in the area of the rotor blade tip (3),
- wherein a surface element (16) is provided in the area of the rotor blade tip (3), which reaches in the direction of the rotor blade root (2) at least up to the drainage bore hole (9),
- wherein the surface element (16) contacts, or connects with, the connection means (18, 19) and/or connection elements (15) on the leading edge (5) and the trailing edge (6), and wherein the surface element (16) is essentially flush with the first molded part (11) in the area of the trailing edge (6).

7. The rotor blade (1) according to claim 6, wherein the surface element (16) comprises a one- or multi-layer fiber glass mat or an aluminum sheet.

8. The rotor blade (1) according to claim 6, wherein the surface element (16) is applied toward the rotor blade tip (3) on an adapter fin (20) of a lightning arrester (10) or is fitted on an adapter fin (20) of a lightning arrester (10).

9. The rotor blade (1) according to claim 6, wherein the surface element (16) is connected with the molded part (12) on its end (16.4) facing away from the rotor blade tip (3) in the area between the connection means (18, 19) or has a distance of less than 10 mm from the second molded part (12).

10. The rotor blade (1) according to claim 6, wherein the connection element (15) and the surface element (16) are designed as one piece.

11. The rotor blade (1) according to claim 6, wherein the at least one connection element (15) on the leading edge (5) comprises a glue flap, which overlaps the suction side (7) and the pressure side (8) and is glued and/or laminated with the first and second molded parts (11, 12).

12. The rotor blade (1) according to claim 11, wherein the glue flap is knitted or woven.

13. The rotor blade (1) according to claim 6, wherein the surface element (16) keeps the drainage bore hole (9) free of the connection means (18, 19).

14. Wind power plant with a rotor blade (1) according to claim 6.

* * * * *